US011082972B2

(12) United States Patent
Jung et al.

(10) Patent No.: US 11,082,972 B2
(45) Date of Patent: Aug. 3, 2021

(54) HARQ PROCESS MANAGEMENT METHOD AND APPARATUS FOR SLOT AGGREGATION

(71) Applicant: Samsung Electronics Co., Ltd., Suwon-si (KR)

(72) Inventors: Euichang Jung, Seoul (KR); Suyoung Park, Uiwang-si (KR); Suha Yoon, Yongin-si (KR); Sunghyuk Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/048,087

(22) Filed: Jul. 27, 2018

(65) Prior Publication Data

US 2019/0037561 A1    Jan. 31, 2019

(30) Foreign Application Priority Data

Jul. 28, 2017    (KR) ......................... 10-2017-0095846

(51) Int. Cl.
| | | |
|---|---|---|
| *H04W 72/04* | (2009.01) | |
| *H04L 5/00* | (2006.01) | |
| *H04L 1/18* | (2006.01) | |
| *H04W 88/08* | (2009.01) | |

(52) U.S. Cl.
CPC ....... *H04W 72/0446* (2013.01); *H04L 1/1812* (2013.01); *H04L 1/1854* (2013.01); *H04L 1/1861* (2013.01); *H04L 1/1896* (2013.01); *H04L 5/0055* (2013.01); *H04L 5/0091* (2013.01); *H04W 72/0406* (2013.01); *H04W 88/08* (2013.01)

(58) Field of Classification Search
CPC ............. H04W 72/0446; H04W 88/08; H04W 72/0406; H04L 5/0055; H04L 1/1812; H04L 1/1854; H04L 1/1861; H04L 1/1896; H04L 5/0091
USPC ......................................................... 370/336
See application file for complete search history.

(56) References Cited

U.S. PATENT DOCUMENTS

| | | | |
|---|---|---|---|
| 2009/0287976 A1 | 11/2009 | Wang et al. | |
| 2014/0192842 A1 | 7/2014 | Xu et al. | |
| 2016/0249338 A1* | 8/2016 | Hwang | ................ H04L 5/1469 |
| 2016/0337086 A1* | 11/2016 | Shen | ...................... H04W 4/70 |
| 2016/0337089 A1* | 11/2016 | Chen | ..................... H04L 1/1861 |
| 2017/0290008 A1* | 10/2017 | Tooher | ................ H04L 1/0007 |

(Continued)

*Primary Examiner* — Faisal Choudhury

(57) ABSTRACT

The present disclosure relates to a communication method and system for converging a fifth generation (5G) communication system for supporting higher data rates beyond a fourth generation (4G) system with a technology for Internet of things (IoT). The present disclosure may be applied to intelligent services based on the 5G communication technology and the IoT-related technology, such as smart home, smart building, smart city, smart car, connected car, health care, digital education, smart retail, security and safety services. A method of operating a terminal for a slot aggregation signaling is provided. The method includes receiving control information including slot aggregation information from a base station, receiving data in aggregated slots based on the slot aggregation information from the base station, and transmitting an acknowledgement (ACK) corresponding to the data to the base station.

10 Claims, 15 Drawing Sheets

(56) References Cited

U.S. PATENT DOCUMENTS

| | | | |
|---|---|---|---|
| 2018/0146439 A1* | 5/2018 | Kim | H04W 52/322 |
| 2018/0279304 A1* | 9/2018 | Lee | H04L 5/0094 |
| 2018/0310300 A1* | 10/2018 | Lin | H04L 5/0091 |
| 2019/0200355 A1* | 6/2019 | Baldemair | H04W 72/042 |
| 2019/0207796 A1* | 7/2019 | Hwang | H04L 1/0045 |
| 2019/0230685 A1* | 7/2019 | Park | H04W 72/12 |
| 2019/0297643 A1* | 9/2019 | Akkarakaran | H04W 72/1289 |
| 2019/0327757 A1* | 10/2019 | Oteri | H04L 5/0053 |

* cited by examiner

HARQ PROCESS MANAGEMENT METHOD AND APPARATUS FOR SLOT AGGREGATION

CROSS-REFERENCE TO RELATED APPLICATION AND CLAIM OF PRIORITY

This application is based on and claims priority under 35 U.S.C. § 119 to Korean Patent Application No. 10-2017-0095846 filed on Jul. 28, 2017, in the Korean Intellectual Property Office, the disclosure of which is incorporated by reference herein in its entirety.

BACKGROUND

1. Field

The present disclosure relates to a mobile communication technology and, in particular, a hybrid automatic repeat request (HARQ) process management method for slot aggregation.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. These frequency bands can be licensed or unlicensed. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Meanwhile, in the current LTE and LTE-advanced (LTE-A) systems, control channels are basically located in a region corresponding to first n (e.g., n=3) symbols at every subframe. A terminal has to perform decoding on the control channels in the control region unless there is a reason to skip decoding. Here, a search space of the resources for the control channel is identified by control channel elements (CCEs), on which the terminal performs a blind decoding.

A hybrid automatic repeat request (HARQ) process is managed with one identifier (ID) per subframe. In the case of frequency division duplexing (FDD), up to 8 HARQ IDs can be used along with corresponding memories.

In the legacy LTE system, data transmission is performed by transport block (TB). A TB is divided into a plurality of code blocks (CBs). Channel coding is performed by CB. In the case where retransmission is required after an initial transmission, the retransmission is performed by TB. Even when decoding fails for only one CB, it is necessary to retransmit the whole TB including the decoding-failed CB.

As described above, a terminal has to basically perform blind decoding for control channels at every subframe in the current LTE and LTE-A systems. On this circumstance, it is possible to restrictively employ semi-persistent scheduling (SPS) for transmitting data in a plurality of subframes by performing a resource allocation once. Such a scheme is useful for services that require repetitive resource allocations for decoding resources, such as voice over LTE (VoLTE). However, even when the decoding for the service identified an SPS-cell-radio network temporary identifier (SPS-C-RNTI) stops, decoding for other services (i.e., identified by other RNTIs) should be continued at every subframe. This means that the control channel overhead problem remains unsolved.

In a 5G new radio access technology (RAT) (NR) system in which the control channels are basically designed per slot, it is necessary to support slot aggregation in a specific scenario. There is therefore a need of a fundamental design of signaling for slot aggregation and downlink control information (DCI).

Furthermore, in consideration of the services characterized by a high data throughput and a long packet length that are predicted to be provided in bands above 6 GHz, it is necessary to introduce an extended slot aggregation concept appropriate for low mobility indoor environments. For example, it is necessary to schedule a plurality of slots by performing a control channel monitoring once.

In uplink, there is a more demanding need for a solution for power restrictions on a physical uplink control channel (PUCCH) and for efficiently supporting a long PUCCH as well as the need for a solution for the aforementioned problems.

Also, there is a need of a method for managing HARQ timings, HARQ process IDs, and HARQ Acknowledgement/Negative-Acknowledgement (ACK/NACK) resources efficiently in consideration of the slot aggregation.

SUMMARY

The present disclosure provides a fundamental design of signaling for slot aggregation and DCI.

Also, the present disclosure provides a method for supporting an extended slot aggregation appropriate for a low mobility indoor environment in consideration of services characterized by a high data throughput and a long packet length.

Also, the present disclosure provides a solution for a power restriction of PUCCH and for supporting a long PUCCH efficiently in uplink.

Also, the present disclosure provides a method for managing HARQ timings, HARQ process IDs, and HARQ ACK/NACK resources efficiently in consideration of the slot aggregation.

In accordance with an aspect of the present disclosure, a method of a terminal for slot aggregation signaling is provided. The method includes receiving control information including slot aggregation information from a base station, receiving data in aggregated slots based on the slot aggregation information from the base station, and transmitting an acknowledgement (ACK) corresponding to the data to the base station.

In accordance with another aspect of the present disclosure, a method of a base station for slot aggregation signaling is provided. The method includes transmitting control information including slot aggregation information to a terminal, transmitting data in aggregated slots based on the slot aggregation information to the terminal, and receiving an acknowledgement (ACK) corresponding to the data from the terminal.

In accordance with another aspect of the present disclosure, a terminal is provided. The terminal includes a transmitter configured to transmit a signal to a base station, a receiver configured to receive a signal from the base station, and a controller coupled with the transmitter and the receiver. The controller is configured to: control the receiver to receive control information including slot aggregation information from the base station, control the receiver to receive data in aggregated slots based on the slot aggregation information from the base station, and control the transmitter to transmit an acknowledgement (ACK) corresponding to the data to the base station.

In accordance with still another aspect of the present disclosure, a base station is provided. The base station includes a transmitter configured to transmit a signal to a terminal, a receiver configured to receive a signal from the terminal, and a controller coupled with the transmitter and the receiver. The controller is configured to control the transmitter to transmit control information including slot aggregation information to the terminal, control the transmitter to transmit data on aggregated slots based on the slot aggregation information to the terminal, and control the receiver to receive an acknowledgement (ACK) corresponding to the data from the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
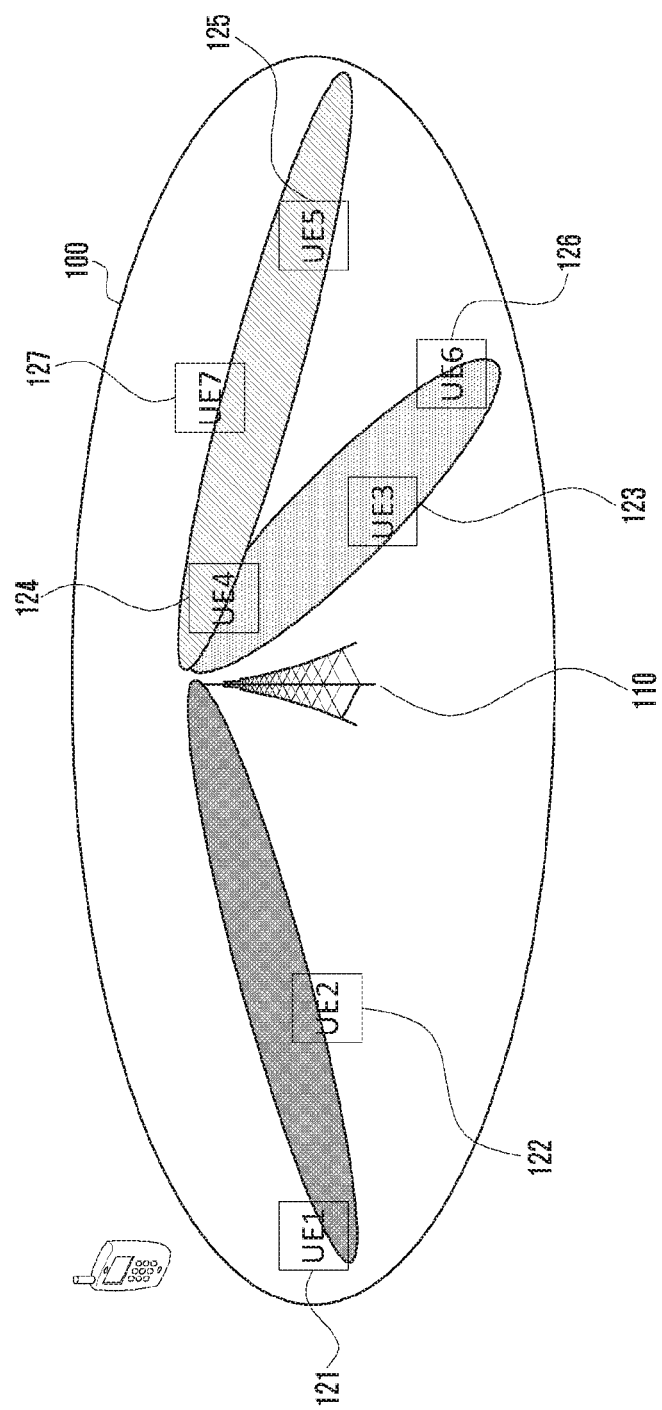
FIG. 1 illustrates an exemplary use case and service scenario to which the present disclosure is implemented.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Various changes may be made to the disclosure, and the invention may have various forms, such that exemplary embodiments will be illustrated in the drawings and described in detail. However, such an embodiment is not intended to limit the invention to the disclosed exemplary embodiments and it should be understood that the embodiments include all changes, equivalents, and substitutes within the spirit and scope of the invention. Detailed descriptions of technical specifications well-known in the art and unrelated directly to the invention may be omitted to avoid obscuring the subject matter of the invention.

As used herein, ordinal terms such as "first," "second," etc. are used to describe various components, however, it is obvious that the components should not be defined by these terms. The terms are used only for distinguishing one component from another component.

The terminology used herein is for the purpose of describing particular embodiments only and is not intended to be limiting of the invention. As used herein, singular forms are intended to include the plural forms as well, unless the context clearly indicates otherwise. It will be understood that the terms "comprises" and/or "has" when used in this specification, specify the presence of a stated feature, number, step, operation, component, element, or a combination thereof, but they do not preclude the presence or addition of one or more other features, numbers, steps, operations, components, elements, or combinations thereof.

Throughout the specification, a module or a unit carries out at least one function or operation and may be implemented in hardware or software or as a combination of hardware and software. Also, a plurality of modules or units may be integrated into one module by at least one processor without the exception of the module or unit which should be implemented with specific hardware.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "user equipment (UE)" is an entity communicating with a BS and may be referred to as UE, device, mobile station (MS), mobile equipment (ME), or terminal.

FIG. 1 illustrates an exemplary use case and service scenario to which the present disclosure is applied.

A base station 110 transmits signals to a plurality of UEs 121 to 127 in downlink within a cell 100 and receives signals from the UEs 121 to 127 in uplink. Although beamforming-based signal transmissions are depicted in the drawing, the present disclosure is not limited thereby. The base station 110 may mean a gNB of a 5G communication system.

Figure 2:
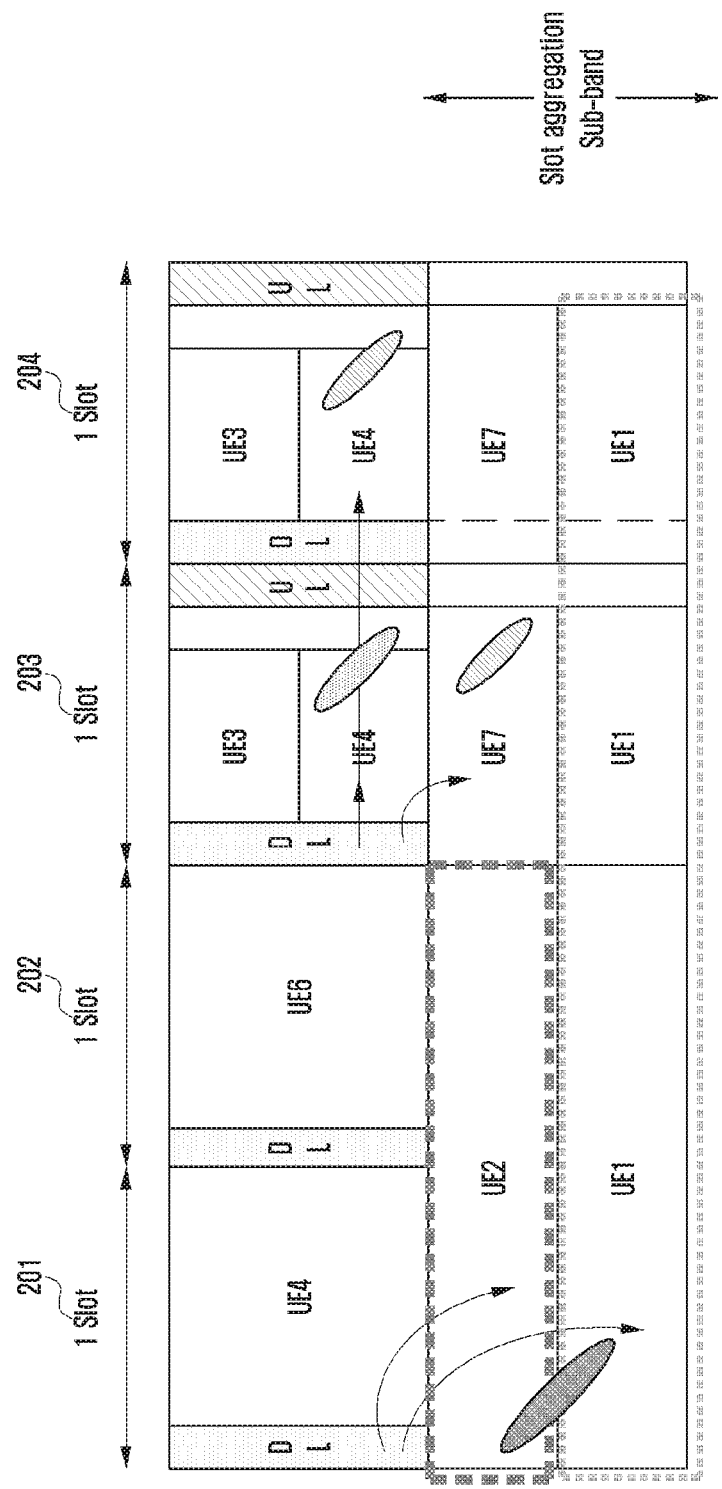
FIG. 2 illustrates an exemplary downlink-centric (or downlink only) frame structure for time division duplexing (TDD) in a service scenario supporting slot aggregation according to one embodiment of the present disclosure.

FIG. 2 illustrates an exemplary downlink-centric (or downlink only) frame structure for time division duplexing (TDD) in a service scenario supporting slot aggregation according to embodiments of the present disclosure.

In reference to FIG. 2, slot aggregations are performed for UE1, UE2, UE4, and UE7. In detail, data transmissions to UE1 and UE2 may be scheduled to span multiple slots in a slot aggregation sub-band based on the downlink control channel of the first slot 201. Likewise, data transmissions to UE4 may be scheduled to span the third and fourth slots 203 and 204 based on the downlink control channel of the third slot 203, and this may be implicitly understood as slot aggregation. Also, data transmission to UE7 may be scheduled to span multiple slots in a slot aggregation sub-band in time-frequency resources, and this may be explicitly understood as aggregation.

Figure 3:
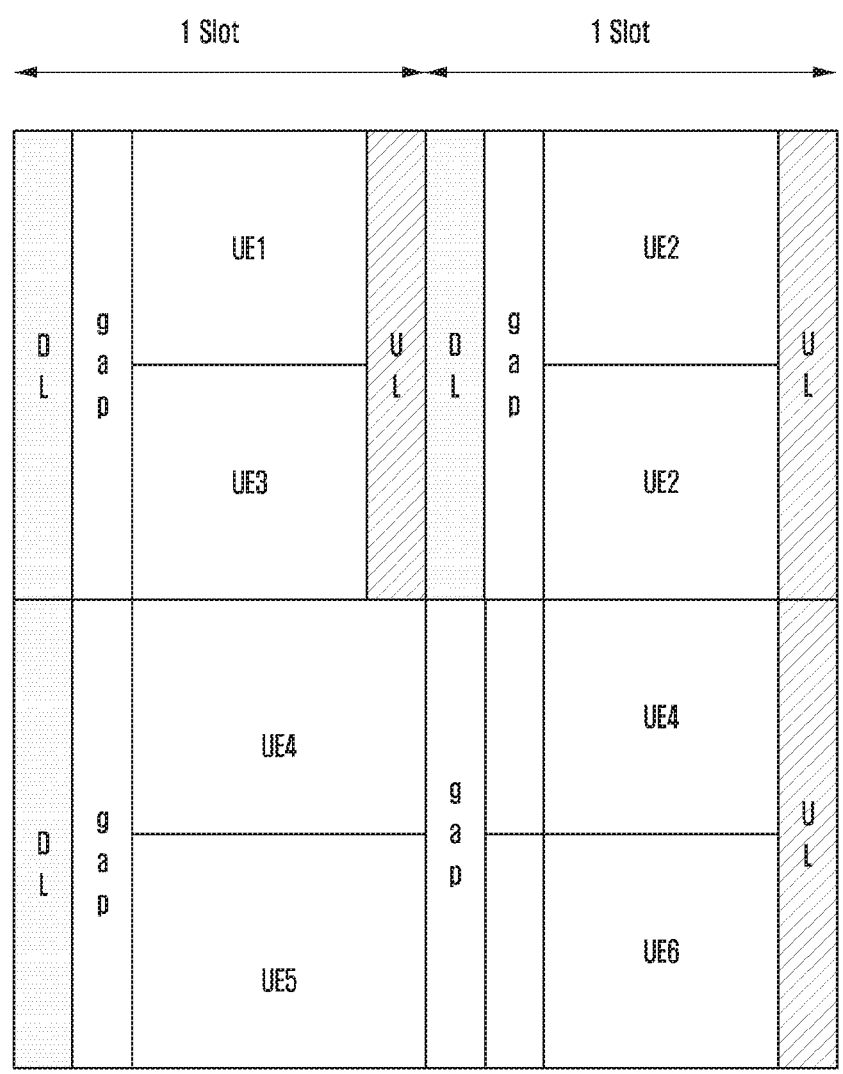
FIG. 3 illustrates an exemplary uplink-centric (or uplink only) frame structure for Time Division Duplex (TDD) in a service scenario supporting slot aggregation according to one embodiment of the present disclosure.

FIG. 3 illustrates an exemplary uplink-centric (or uplink only) frame structure for TDD in a service scenario supporting slot aggregation.

Similar to the downlink frame structure for TDD as depicted in FIG. 2, data transmission of UE4 may be scheduled to span multiple slots.

Figure 4:
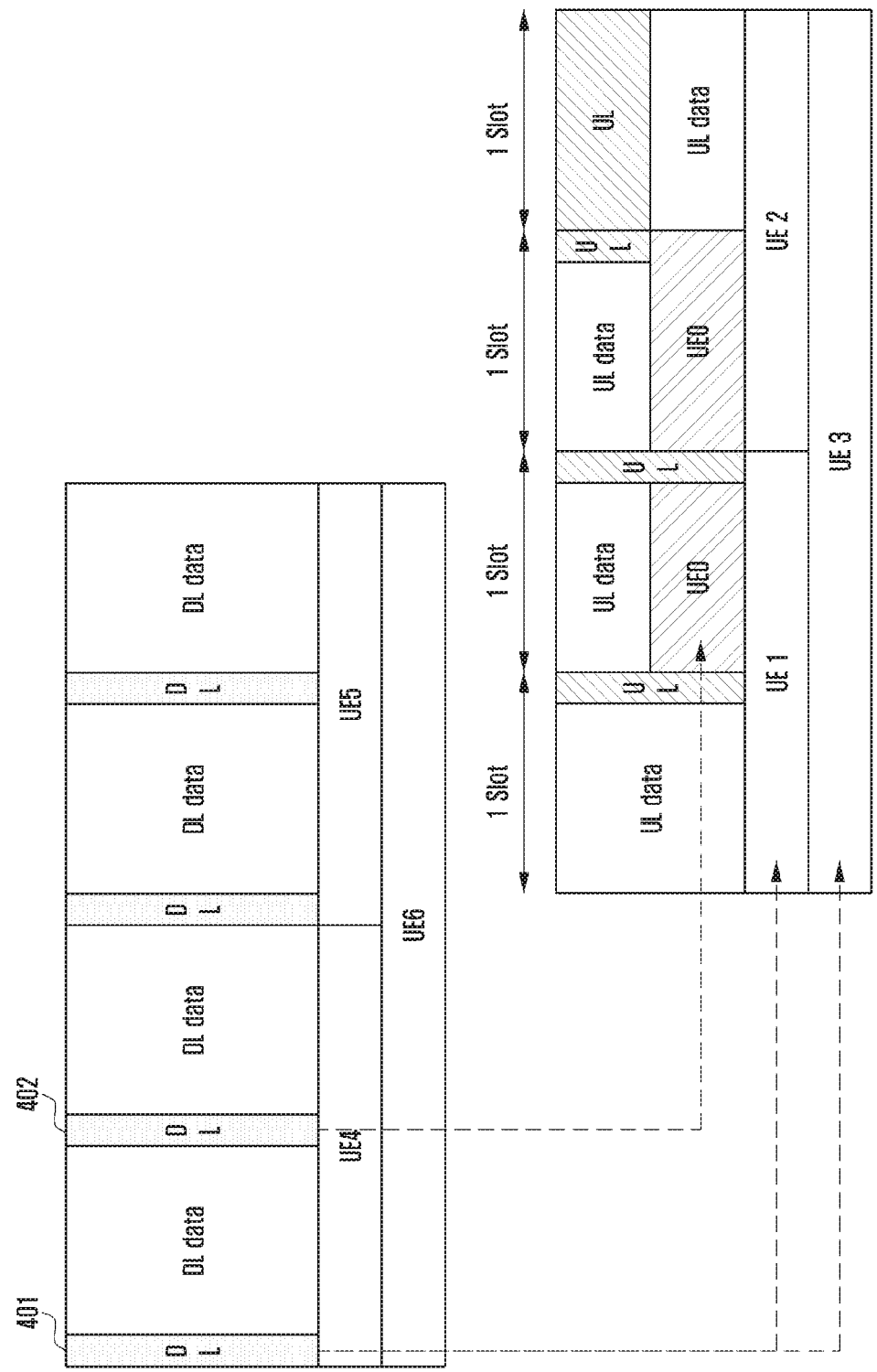
FIG. 4 illustrates an exemplary downlink and uplink frame structures for Frequency Division Duplex (FDD) in a service scenario supporting slot aggregation according to one embodiment of the present disclosure.

FIG. 4 illustrates exemplary downlink and uplink frame structures for FDD in a service scenario supporting slot aggregation.

In reference to FIG. 4, downlink transmissions to UE4, UE5, and UE6 may be scheduled to span multiple slots. Also, uplink transmissions of UE1 and UE3 may be scheduled to span multiple slots based on the control channel 401 of the first downlink slot, and uplink transmission of UE0 may be scheduled to span multiple slots based on the control channel 420 of the second downlink slot. These may be understood as slot aggregation implicitly or explicitly.

TABLE 1

| Resource allocation Parameters & DCI | RRC | MACCE | Group common | UE specific |
|---|---|---|---|---|
| Setting (parameters) | ✓ | | | |
| Configuration | | ✓ | | |
| Activation (or deactivation) | | ✓ | ✓ | ✓ |
| Starting slot (whether cross slot scheduling or not) | | | ✓ | ✓ |
| Spanned slot duration (slot aggregation level) | ✓ | | | ✓ |
| Mini-slot | ✓ | | | ✓ |
| Starting position of DL/UL data (# symbol level) | | | ✓ | ✓ |
| PDCCH/PUCCH decoding b/w slots | | | | ✓ |
| HARQ process number | | | | ✓ |
| HARQ timing (one value or set of value) | ✓ | | | ✓ |
| TB size (# of PRB, TBS index) | | | | ✓ |
| Multiple bits HARQ ACK/NACK | ✓ | | | ✓ |
| NDI, RV | | | | ✓ |
| Slot composition bit (1TB/1 slot or 1TB/1 allocation) | ✓ | ✓ | | ✓ |
| Uplink waveform (OFDM or DFT-S-OFDM) | ✓ | ✓ | ✓ | |
| Long PUCCH/Short PUCCH | ✓ | ✓ | ✓ | ✓ |

Table 1 exemplifies signaling parameters and downlink control information (DCI) for slot aggregation.

It may be possible to design a signal for slot aggregation using some or all of the parameters and DCI listed in Table 1. In reference to Table 1, a signal for slot aggregation may be configured based on DCI by referencing Table 1.

The parameters and DCI listed in Table 1 for use in slot aggregation signaling may be transmitted directly or indirectly in the form of at least one of radio resource control (RRC) signaling, media access control (MAC) control element (CE), and group-common or UE-specific control channel (e.g., physical downlink control channel (PDCCH)).

In Table 1, the parameter "starting slot" denotes an indicator indicating a starting slot of slot aggregation when slot aggregation is applied. The parameter "starting slot" may also indicate whether a cross slot scheduling is applied. In Table 1, the parameter "spanned slot duration" indicates how many slots are aggregated, i.e., slot aggregation level. In Table 1, the parameter "starting position of DL/UL data" indicates a starting position of uplink or downlink data within a slot at a symbol level.

In reference to Table 1, the parameter "starting slot" may be transmitted from a next generation NB (gNB) to a UE through a group-common or UE-specific control channel, and the parameter "spanned slot duration" may be transmitted from the gNB to the UE through RRC signaling. Also, the parameter "starting position of DL/UL data" may be transmitted from the gNB to the UE through a group-common or a UE-specific control channel.

Also, the parameters "PDCCH/PUCCH decoding bandwidth (b/w) slots," "HARQ process number," "HARQ timing," and "TB size" for use in slot aggregation may be transmitted from the base station to the UE through a UE-specific control channel. The group-common PDCCH may include information on a slot structure.

Figure 5:
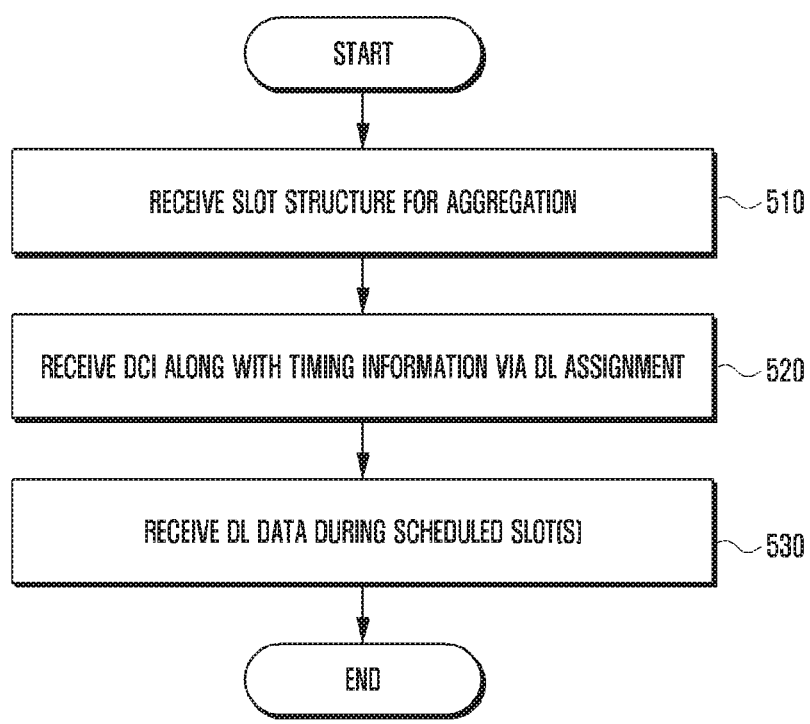
FIG. 5 is a flowchart for explaining an exemplary basic signaling for slot aggregation according to one embodiment of the present disclosure.

FIG. 5 is a flowchart for explaining basic signaling for slot aggregation according to one embodiment of the present disclosure.

In reference to FIG. 5, a UE performs steps for signaling based on slot aggregation. In detail, the UE may receive, at step 510, information on a slot structure for slot aggregation. At step 520, the UE may receive DCI along with timing information via a downlink assignment. For example, the UE may receive an index of the starting slot and the parameter "spanned slot duration" as shown in Table 1. At step 530, the UE may receive downlink data during the scheduled slot(s).

Meanwhile, in order to perform downlink slot aggregation signaling, it may be possible that the initial parameters for slot aggregation may be configured in a UE-specific or cell-specific manner through RRC signaling.

According to another embodiment of the present disclosure, it may be possible to perform slot structure-based signaling. For example, it may be possible to signal a unified slot structure in a certain format with a slot aggregation design. For example, it may be possible to use a joint coding scheme.

Figure 6:
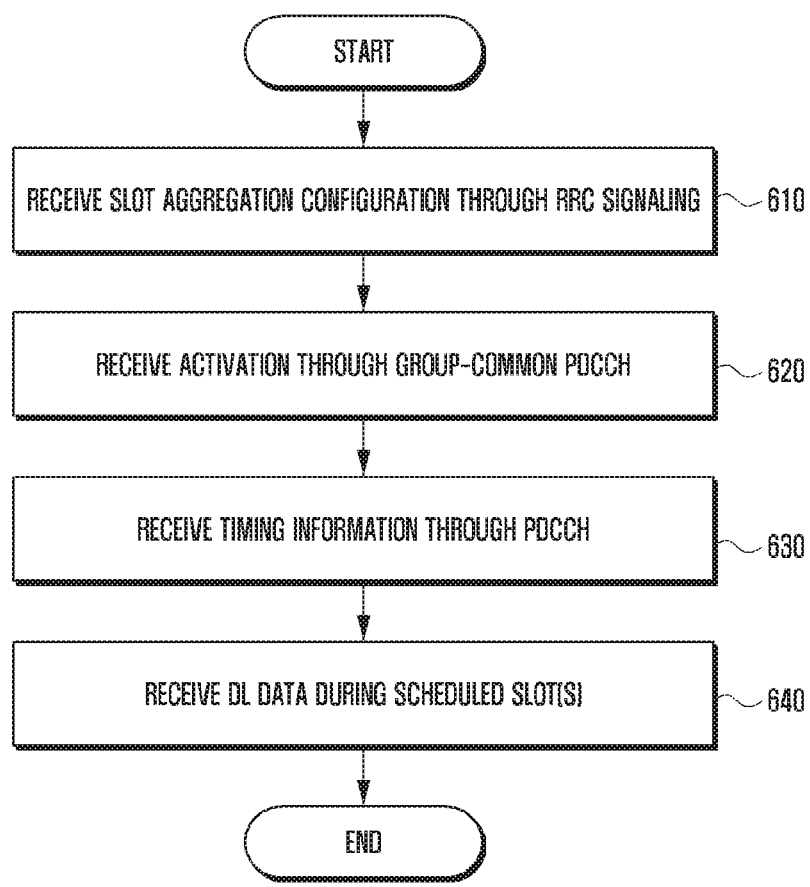
FIG. 6 is a flowchart illustrating an exemplary group-common PDCCH-based slot aggregation method according to one embodiment of the present disclosure.

According to another embodiment of the present disclosure, it may be possible to perform signaling with a slot structure and aggregation information. For example, the slot structure and aggregation information may be signaled via an RRC configuration. It may also be possible to signal the slot structure and aggregation information in an explicit method by including a signaling bit in the group-common PDCCH information. Alternatively, it may also be possible to use an implicit method in which, if group-common PDCCH decoding is configured through RRC signaling, this is determined as slot aggregation signaling. FIG. 6 is a flowchart illustrating a group-common PDCCH-based slot aggregation method. In reference to FIG. 6, the UE may receive slot aggregation configuration through RRC signaling at step 610, receive activation through a group-common PDCCH at step 620, receive timing information (e.g., starting slot index and parameter "spanned slot duration" of Table 1) through the PDCCH at step 630, and receive downlink data during the scheduled slot(s). According to another embodiment of the present disclosure, the UE may receive a slot aggregation structure through RRC signaling at step 610 and determine the slot aggregation structure based only on whether the group-common PDCCH decoding succeeds or fails.

It may also be possible to signal a slot composition bit, e.g., 1 TB/1 slot (0) or 1 TB/1 allocation (1).

A description is made of the method for determining an HARQ ACK/NACK timing and process number (ID) and allocating PDCCH resources for managing an HARQ process in slot aggregation.

Embodiment 1

Figure 7:
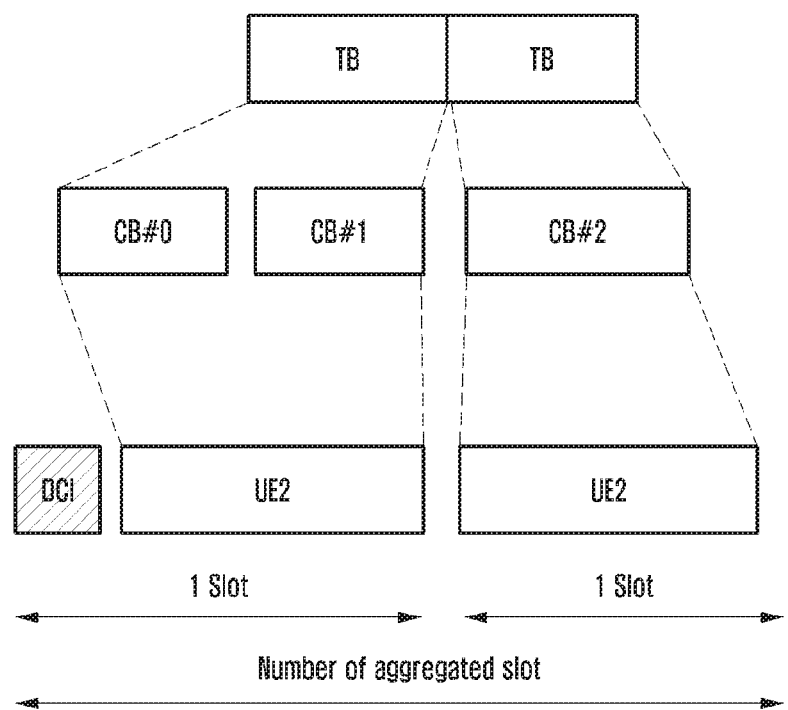
FIG. 7 illustrates an exemplary configuration of TBs and a slot aggregation level for the case where the slot aggregation level is 2 according to one embodiment of the present disclosure.

FIG. 7 is a diagram illustrating a configuration of TBs and a slot aggregation level for the case where the slot aggregation level is 2.

In reference to FIG. 7, a TB is transmitted by a slot (i.e., 1 TB per a slot), and the DCI may include slot aggregation information at the first allocation timing.

In detail, the first TB includes CB #0 and CB #1 associated with the first slot, and the second TB includes CB #2 associated with the second slot. That is, the first TB is associated with the first slot, and the second TB is associated with the second slot. The slot aggregation information may be included in the DCI that is followed by the first slot.

In order to indicate that the TB and slot aggregation level are configured according to Embodiment 1, a slot composition bit may be used.

1. HARQ ACK/NACK Timing Determination

Assuming that the current slot is N and the starting slot of spanned slots is k, a set of candidates of slot k may be configured at slot N+k through RRC signaling, and the value of k or a corresponding index may be explicitly signaled using UE-specific DCI.

For example, at least one of the spanned slot duration (l slot), resource assignment information, and HARQ timing information (m slots) may be included in the DCI that is transmitted at the timing of slot N. The resource assignment information may include a symbol level starting position of downlink/uplink (DL/UL) data and PDCCH/PUCCH decoding b/w slots.

A gNB may transmit the above information using separate resources. A common value may be determined. The respective information may be transmitted in a joint coding format. For example, the information combining spanned slot duration and HARQ timing information may be configured in the form of a table. This is just an exemplary combination of two of many parameters included in the DCI, and the present disclosure may include other solutions.

Figure 8:
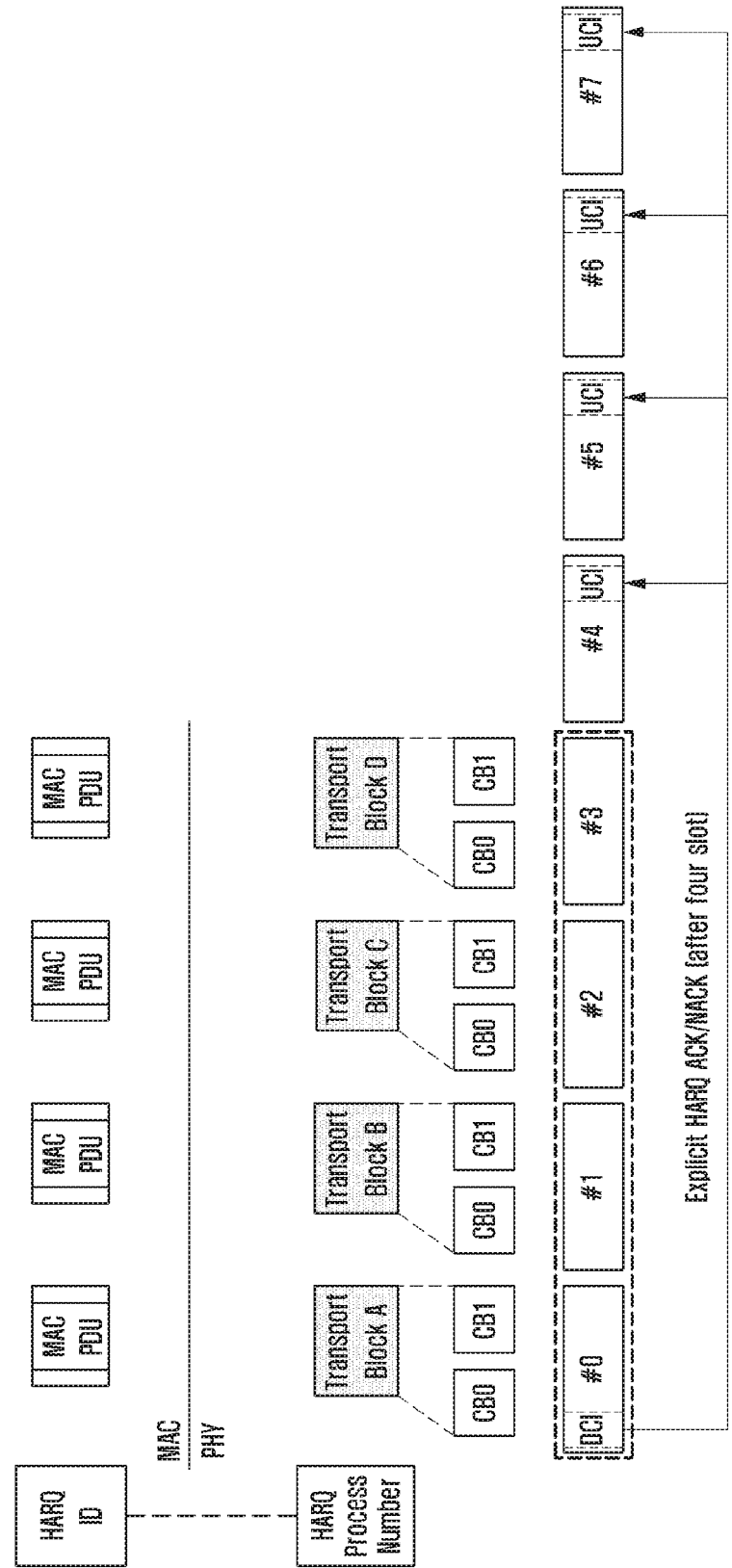
FIG. 8 illustrates an exemplary HARQ process with an HARQ ACK/NACK timing of 4 and an HARQ process number and a slot aggregation level that are identical with each other according to one embodiment of the present disclosure.

The UE may determine a plurality of HARQ timings of m, m+1, ..., m+l−1 in sequence based on the explicit signaling about the HARQ timing information m and the spanned slot duration l. FIG. 8 is a diagram illustrating an HARQ process with a HARQ ACK/NACK timing of 4 and a HARQ process number and a slot aggregation level that are identical with each other. In the embodiment of FIG. 8, the UE may ascertain that the HARQ timing information for the aggregated slots #0 to #3 is carried in the uplink control information (UCI) of slots #4 to #7 based on the HARQ timing information m set to 4 and the spanned slot duration l set to 4 that are received from the gNB.

Alternatively, the UE may determine at least one of the slot m+l+1 or the slot m as the HARQ timing based on explicit signaling about the HARQ timing information m and the spanned slot duration l. In the embodiment of FIG. 8, the UE may ascertain that the HARQ timing information for the aggregated slots #0 to #3 is carried in UCI of slot #4 or #7 based on the HARQ timing information m set to 4 and the spanned slot duration l set to 4 that are received from the gNB.

According to another embodiment of the present disclosure, at least one of starting slot k (e.g., K=2), spanned slot duration (l slots), resource assignment information, and HARQ timing information (m slots) is included in the DCI that is transmitted at the timing of slot N.

The gNB may transmit the above information using separate resources. A common value may be determined. Each individual information may be transmitted in a joint coding format. For example, spanned slot duration-HARQ timing information combination values may be configured in the form of a table. This is just an exemplary combination of two of many parameters included in the DCI, and the present disclosure may include other solutions.

The UE may determine a plurality of HARQ timings of m+k, m+k+1, ..., m+k+l−1 in sequence based on the explicit signaling about the starting slot k of the spanned slots in association with the current slot N, HARQ timing information, and spanned slot duration l. That is, the UE may transmit an ACK/NACK corresponding to the TB/CB(s) at the timing of m slots after the actual transmission timing of the spanned data. In the embodiment of FIG. 8, the UE may ascertain that the HARQ timing information corresponding to the aggregated slots #2 and #3 is carried in UCI of slots #6 and #7 based on the starting slot k set to 2, HARQ timing information m set to 4, and spanned slot duration l set to 4 that are received from the gNB.

Alternatively, the UE may determine slot m+k+l−1 as the HARQ timing based on explicit signaling about starting slot k of the spanned slots in association with the current slot N, HARQ timing information m, and spanned slot duration l. That is, the terminal may transmit an ACK/NACK corresponding to the TB/CB(s) m slots after the actual transmission timing of the spanned data. In the embodiment of FIG. 8, the UE may ascertain that the HARQ timing information for the aggregated slots #2 and #3 is carried in the UCI of slot #7 based on the starting slot K set to 2, HARQ timing information m set to 4, and spanned slot duration l set to 4 that are received from the gNB.

According to another embodiment of the present disclosure, at least one of the spanned slot duration (l slot), resource assignment information, HARQ timing information (m slots), and HARQ set interval (p slots) is included in the DCI that is transmitted at the timing of slot N. That is, the information on the HARQ set interval (p slots) may be transmitted in addition. The HARQ set interval p may be set to a value less than the spanned slot duration l (p<l). Alternatively, the HARQ set interval p may be set to a value greater than the spanned slot duration (p>l).

The gNB may transmit the above information using separate resources. A common value may be determined. Each individual information may be transmitted in a joint coding format. For example, spanned slot duration-HARQ timing information combination values may be configured in the form of a table. This is just an exemplary combination of two of many parameters included in the DCI, and the present disclosure may include other solutions.

Meanwhile, the UE may determine a plurality of HARQ timings of m, m+n, m+2n, m+3n, ... (<l) in sequence based on the explicit signaling about the HARQ timing information m, spanned slot duration l, and HARQ set interval n that are received from the gNB. That is, the UE may be configured to transmit the HARQ ACK/NACK accumulated till the indicated timing. In the embodiment of FIG. 8, the UE may ascertain that the HARQ timing information corresponding to the aggregated slots #0 to #2 is carried in the UCI of slots #4 and #6 based on the HARQ timing information set to 4, spanned slot duration l set to 3, and HARQ set interval set to 2 that are received from the gNB. The UCI of slot #4 carries the HARQ information corresponding to slot #0, and the UCI of slot #6 carries the HARQ information corresponding to slots #1 and #2.

2. HARQ Process Number Determination

In the case where the HARQ process number and the slot aggregation level are identical with each other as shown in FIG. 8, at least one of HARQ timing information, slot aggregation level l, and HARQ process number p may be included in DCI that is transmitted at the timing of slot N.

A gNB may transmit the above information using separate resources. A common value may be determined. Each individual information may be transmitted in a joint coding format. For example, combinations of at least two of HARQ timing information, slot aggregation level, and HARQ process number of process ID may be configured in the form of a table. This is just an exemplary combination of some many parameters included in the DCI, and the present disclosure may include other solutions.

Although the gNB transmits only the HARQ process number p, it may additionally generate l−1 HARQ process numbers such as p', p", and p''' and 4 extra redundancy versions (RVs) per HARQ process number for the purpose of managing one HARQ process. The HARQ process number may be determined in the ascending order (+1), the descending order (−1), or a circular order that is determined according to a predetermined rule (e.g., calculated with an equation). For example, the HARQ process numbers of 2, 3, 0, and 1 may be assigned in a circular order. If a previously assigned HARQ process number is reassigned, a circular operation may be performed again.

The UE may map the HARQ process IDs to the HARQ timings based on the HARQ timing information m, spanned slot duration l, and HARQ process number p included explicitly in the DCI to manage the HARQ process IDs. Although one HARQ process ID per HARQ process is required, i.e., a plurality of HARQ process IDs are required, for HARQ process management, the UE receives only one HARQ process number p. Accordingly, the UE has to generate l−1 extra numbers such as p', p", and p''' based on the received HARQ process number p. In this case, the HARQ process numbers may be generated according to a rule agreed with the gNB, e.g., in the ascending order (+1), the descending order (−1), or a circular order that is determined on the basis of calculation with an equation. For example, the HARQ process numbers of 2, 3, 0, and 1 are generated in a circular manner (i.e., interpreted based on implicit signaling). If a previously assigned HARQ process number is reassigned, a circular operation may be performed again. The UE may also perform memory management for resource assignment information received per HARQ process ID.

According to another embodiment of the present disclosure, at least one of the HARQ timing information, slot aggregation level l, and a plurality of HARQ process numbers p, p', p", p''' . . . may be included in the DCI that is transmitted at the timing of slot N. That is, a plurality of HARQ process numbers may be transmitted.

The gNB may transmit the above information using separate resources. A common value may be determined. Each individual information may be transmitted in a joint coding format. For example, the slot aggregation level may be assigned to separate resources while the HARQ timing information and HARQ process numbers (e.g., HARQ timing information, HARQ process number #1, . . . , HARQ process number #l) may be configured explicitly or as combinations in the form of a table. The gNB may determine the HARQ process number in the ascending order (+1), the descending order (−1), or a circular order that is determined according to a predetermined rule (e.g., calculated with an equation). For example, the HARQ process numbers of 2, 3, 0, and 1 may be generated in a circular manner. If a previously assigned HARQ process number is reassigned, a circular operation may be performed again. This is just an exemplary combination of two of many parameters included in the DCI, and the present disclosure may include other solutions.

The UE may map the HARQ process IDs to the HARQ timings based on the HARQ timing information m, spanned slot duration l, and HARQ process number p included explicitly in the DCI to manage the HARQ process IDs. The UE may also make an interpretation based on explicit signaling to perform memory management for resource assignment information received per HARQ process ID.

3. PUCCH Resource Determination for HARQ ACK/NACK

After determining the HARQ timing with the above-described method, a set of resources for HARQ ACK/NACK corresponding to a data transmission is configured on PUCCH resources through higher layer signaling, and the resource region for the corresponding UE is indicated in the UE's DCI. In FIG. 8, the UCI may include HARQ ACK/NACK information.

The PUCCH resource may include a short PUCCH with 1 or 2 symbols and/or a long PUCCH with 4 or more symbols. Typically, the short PUCCH may be used in an above 6 GHz band, and the long PUCCH may be used in a below 6 GHz band for covering the LTE cell coverage.

In this case, cyclic prefix orthogonal frequency division multiplexing (CP-OFDM) or discrete Fourier transform-spread-OFDM (DFT-S-OFDM) may be applied to the uplink waveform for the short PUCCH. Also, the DFT-S-OFDM may be applied to the uplink waveform for the long PUCCH.

A resource allocation region for use by the UE in transmitting the UCI including the HARQ ACK/NACK may be prefigured along with the DCI. The preconfigured region may be assigned via a semi-static scheduling through RRC signaling or a dynamic scheduling with DCI in the time-frequency resources.

The related DCI may include at least one of resource assignment information for UCI including the HARQ ACK/NACK, waveform information, and PUCCH type information. For example, the resource assignment information may include an RB location, a starting position, and a PRB number. The waveform information has a bitwidth of 1 bit indicating the CP-OFDM or the DFT-S-OFDM. The PUCCH type information has a bitwidth of 1 bit indicating the short PUCCH or the long PUCCH.

For example, at least one of the resource assignment information, waveform information, and PUCCH type information may be included in the DCI. Each of these information has a single value.

The gNB may transmit the above information using separate resources. A common value may be determined. The PUCCH type information and the waveform information may be mapped one by one. For example, an indication bit may be set to 0 for the short PUCCH and CP-OFDM or 1 to indicate the long PUCCH and the DFT-S-OFDM. The individual information may be transmitted in a joint coding format. For example, any combinations of a resource assignment information index, the waveform information, the resource assignment information, and the PUCCH type information may be configured in the form of a table. These are just exemplary combinations of parameters selected from DCI, and the present disclosure may include other solutions.

According to an embodiment of the present disclosure, although the gNB transmits the resource assignment information indicating the RB locations once, the PUCCH resources for HARQ ACK/NACK may be assigned, i.e., reserved, at the same resource location as the RB indicated by the resource assignment information during the period of l slots from slot m indicated by the HARQ timing information for l resource allocations.

According to another embodiment of the present disclosure, although the gNB transmits the resource assignment information indicating the RB location once, the PUCCH resources for HARQ ACK/NACK may be assigned, i.e., reserved, on the frequency indicated by the resource assignment information at least at one of HARQ timings m+l−1 and m for l resource allocations.

According to another embodiment of the present disclosure, although the gNB transmits the resource assignment information indicating the RB location once, the PUCCH resources for HARQ ACK/NACK may be assigned, i.e., reserved, in the code domain as indicated in the resource assignment information at least at one of HARQ timings m+l−1 and m for l resource allocations.

According to another embodiment of the present disclosure, although the gNB transmits the resource assignment information indicating the RB location once, the PUCCH resources for HARQ ACK/NACK may be assigned, i.e., reserved, at resource locations determined according to a predetermined rule during the period of l slots from slot m indicated by the HARQ timing information for l resource allocations. The predetermined rule may mean the ascending order (+1, +2, . . . ), the descending order (−1, −2, . . . ), or a predetermined equation.

The UE may transmit the UCI including an HARQ ACK/NACK based on at least one of the resource assignment information, waveform information, and PUCCH type information that are explicitly included in the DCI. For example, the resource assignment information may include an index of the assigned resources. Although the UE needs l pieces of resource assignment information, only one resource assignment information value may be received. In this case, the UE has to estimate $2^l-1$ pieces of extra resource assignment information from one resource assignment information.

According to an embodiment of the present disclosure, the UE may assume that the PUCCH resources for HARQ ACK/NACK are assigned, i.e., reserved, at the same resource location during the period of l slots from slot m indicated by the HARQ timing information.

According to another embodiment of the present disclosure, although the gNB transmits the resource assignment information indicating the RB location once, the UE may transmit the individual HARQ responses on l resources (index+1, index+2, . . . ) sequentially at the corresponding frequency at least at one of HARQ timings m+l−1 and m based on the index in the resource assignment information received for l resource allocations.

According to another embodiment of the present disclosure, although the gNB transmits the resource assignment information indicating the RB location once, the UE may transmit individual HARQ responses on l resources (code index+1, code index+2, . . . , code index #l) in the code domain as indicated by the resource assignment information at least at one of HARQ timings m+l−1 and m based on the index in the resource assignment information for l resource allocations.

According to another embodiment of the present disclosure, although the gNB transmits the resource assignment information indicating RB locations during the period of l slots from slot m indicated by the HARQ timing information once, the UE may transmit individual HARQ responses at the resource locations determined according to a predetermined rule during the period of l slots from slot m indicated by the HARQ timing information for l resource allocations. That is, the UE may determine the PUCCH resources for HARQ ACK/NACK based on implicit signaling. The predetermined rule may mean the ascending order (+1, +2, . . . ), the descending order (−1, −2, . . . ), and a predetermined equation.

According to another embodiment of the present disclosure, the resource assignment information, waveform information, and PUCCH type information may be designated as many slot aggregation level l as independently or partially.

A gNB may transmit the above information using separate resources. A common value may be determined. The PUCCH type information and the waveform information may be mapped one by one. For example, an indication bit may be set to 0 for the short PUCCH and CP-OFDM or 1 to indicate the long PUCCH and the DFT-S-OFDM. The individual information may be transmitted in a joint coding format. For example, any combinations of the resource assignment information-waveform information and the resource assignment information-PUCCH type information may be configured in the form of a table. These are just exemplary combinations of parameters selected from DCI, and the present disclosure may include other solutions.

The UE may transmit the UCI including an HARQ ACK/NACK based on at least one of the resource assignment information, waveform information, and PUCCH type information that are explicitly included in the DCI. Here, the HARQ ACK/NACK may be transmitted in the form of 1-bit information indicating whether TB decoding succeeds or consists of ACK/NACK indication bits for respective CBs or CB groups (CBGs).

4. Operations of gNB and UE in Slot Aggregation-Based Data Transmission Failure

Figure 9:
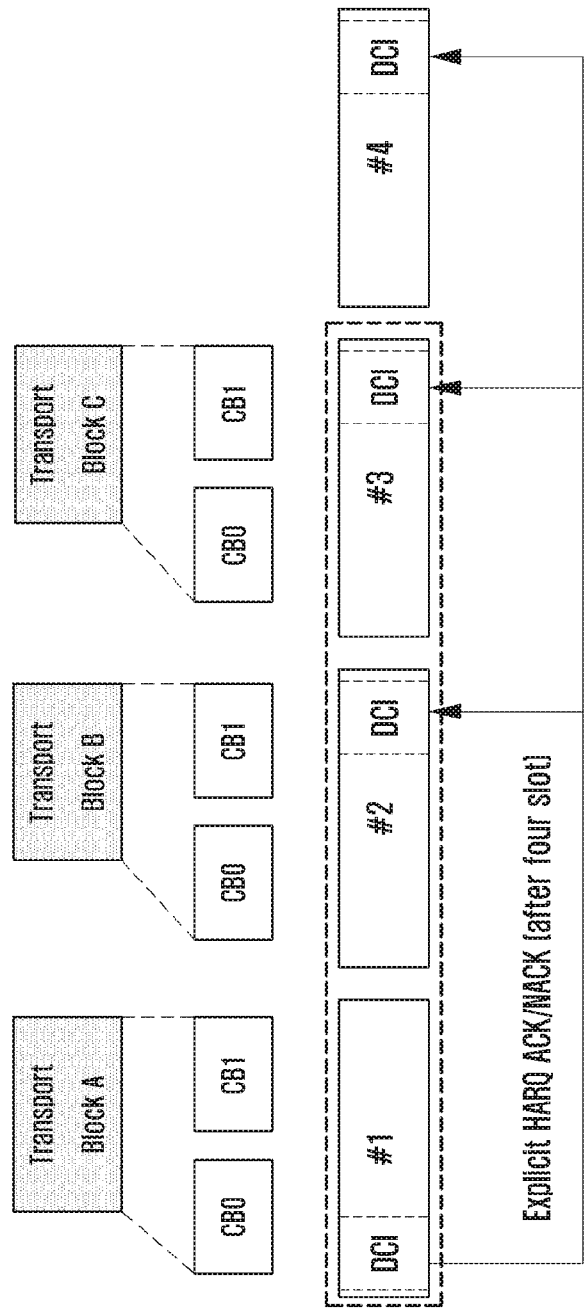
FIG. 9 illustrates an exemplary HARQ process based on slot aggregation information included in DCI transmitted from a gNB to a UE according to an embodiment of the present disclosure.

FIG. 9 is a diagram illustrating an HARQ process based on slot aggregation information included in DCI transmitted from a gNB to a UE according to an embodiment of the present disclosure. In the embodiment of FIG. 9, it is assumed that the aggregation level is 3 and the UE capability in use is superior to that in use in the embodiment of FIG. 8 in which HARQ signaling is explicitly performed after 3 slots such that the HARQ ACK/NACK feedback can be processed immediately in the next slot. The gNB may stop the slot aggregation-based data transmission at slot #3 or #4 according to the HARQ ACK/NACK included in the UCI that is transmitted by the UE at slot #2.

For example, if the UE fails to decode the received DCI (e.g., if cyclic redundancy check (CRC) failure occurs), the gNB cannot receive an ACK/NACK from the UE. In this case, the gNB may stop transmission at slot #2 or #3 and assigns the corresponding resources to another UE, thereby improving the total throughput of the cell.

Embodiment 1-1

Figure 10:
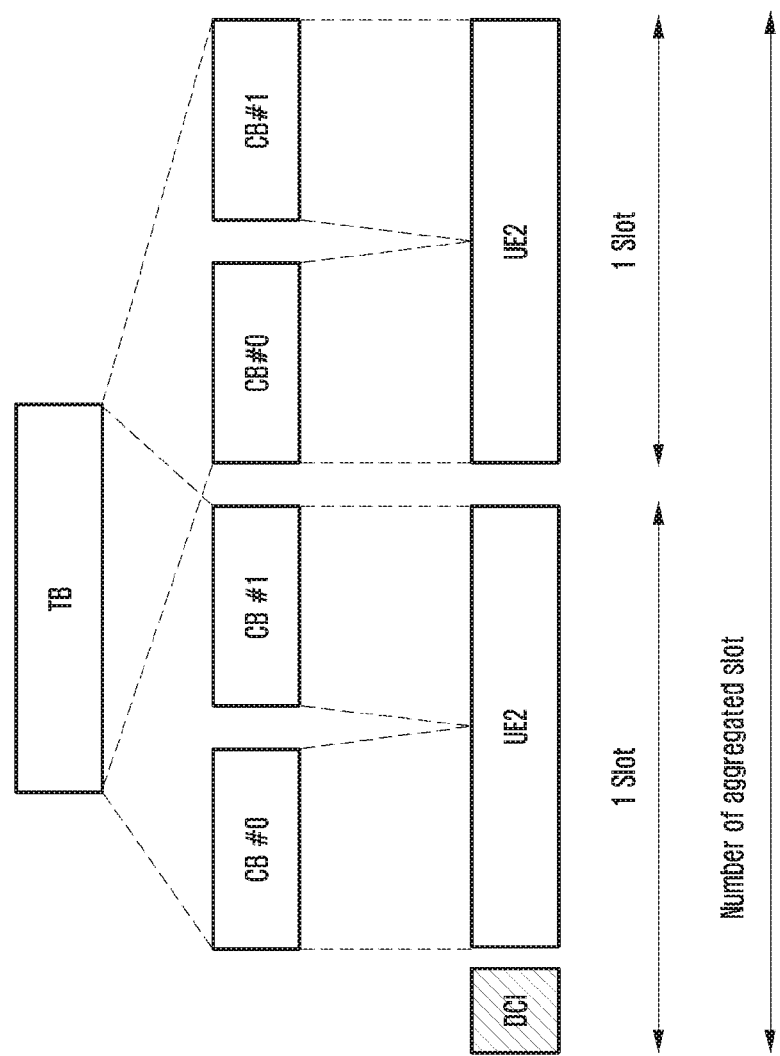
FIG. 10 illustrates an exemplary embodiment where a TB is transmitted repetitively in multiple slots according to one embodiment of the present disclosure.

FIG. 10 is a diagram illustrating an exemplary situation where a TB is transmitted repetitively in multiple slots.

In the situation as depicted in FIG. 10, assuming assignment similar to the case of FIG. 7, it may be possible to use the same HARQ process ID. The gNB may transmit information for repetitive data transmission.

For example, the gNB may notify the UE whether one TB is repetitively transmitted during a period of multiple slots explicitly or implicitly, using an HARQ ACK/NACK timing, an HARQ process number, and PUCCH resource assignment information.

For example, it may be possible to additionally transmit an indicator indicating whether a TB is repetitively transmitted. As another example, at least one of a new data indicator (NDI) and a redundancy version (RV) value may be combined with the HARQ process number to configure such an indicator. The corresponding information may be configured such that the HARQ process number or a PUCCH resource assignment information is repetitively assigned.

Embodiment 2

Figure 11:
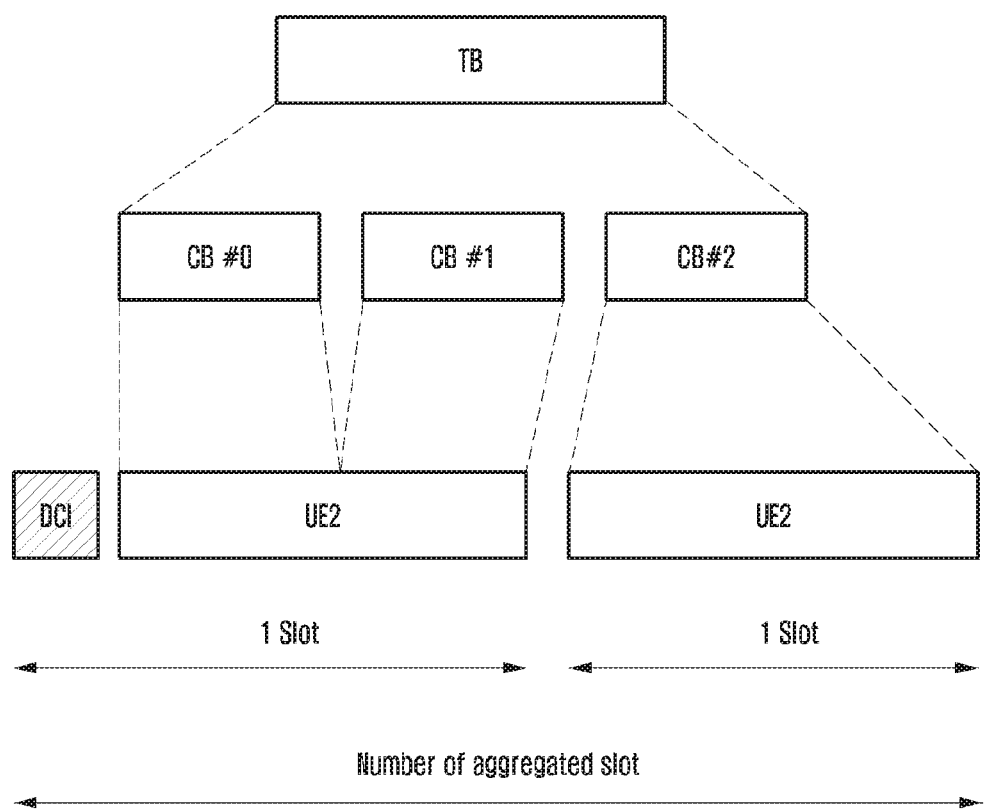
FIG. 11 illustrates an exemplary embodiment where a slot aggregation level 2 is used.

FIG. 11 is a diagram illustrating an exemplary situation where a slot aggregation level 2 is used.

In reference to FIG. 11, a TB is transmitted by the unit of multiple slots which are allocated at the same time (i.e., 1 TB per allocation: multiple slots), and the slot aggregation information may be included in the DCI at the assignment timing.

In detail, a TB consists of CB #0 and CB #1 associated with the first slot and CB #2 associated with the second slot. That is, unlike the embodiment of FIG. 7, the TB is associated with both the first and second slots in the embodiment of FIG. 11. At the beginning of the first slot, the DCI including the slot aggregation information may be transmitted.

In order to indicate that the TB and slot aggregation level are configured according to the Embodiment 2, a slot composition bit may be used.

1. HARQ ACK/NACK Timing Determination

Assuming that the current slot is N and the starting slot of spanned slots is k, a set of candidates of slot k may be configured at slot N+k through RRC signaling, and the value of k or corresponding index may be explicitly signaled using UE-specific DCI.

For example, at least one of the spanned slot duration (l slots), resource assignment information, and HARQ timing information (m slots) may be included in the DCI that is transmitted at the timing of slot N. The resource assignment information may include a symbol level starting position of downlink/uplink (DL/UL) data and PDCCH/PUCCH decoding b/w slots.

A gNB may transmit the above information using separate resources. A common value may be determined. Each individual information may be transmitted in a joint coding format. For example, spanned slot duration-HARQ timing information combination values may be configured in the form of a table. This is just an exemplary combination of some of many parameters included in the DCI, and the present disclosure may include other solutions.

The UE may determine at least one of slots m+l−1 and m as the HARQ timing based on the explicit signaling of the HARQ timing information m and the spanned slot duration l.

As another example, at least one of the starting slot k, spanned slot duration (l slots), resource assignment information, and HARQ timing information (m slots) may be included in the DCI that is transmitted at slot timing N. That is, extra information on the starting slot k (e.g., k=2) may be transmitted.

A gNB may transmit the above information using separate resources. A common value may be determined. Each individual information may be transmitted in a joint coding format. For example, spanned slot duration-HARQ timing information combination values may be configured in the form of a table. This is just an exemplary combination of some of many parameters included in the DCI, and the present disclosure may include other solutions.

The UE may determine slot m+k+l−1 as the HARQ timing based on the explicit signaling about the starting slot k of the spanned slots in association with the current slot N, HARQ slot timing information m, and spanned slot duration l. That is, the UE may transmit the ACK/NACK corresponding to the TB/CB at a timing m slots after the transmission timing of the spanned data.

As another example, the gNB may configure such that the UE performs slot aggregation intrinsically without any explicit signaling. In this case, the UE may receive one TB at one intrinsically aggregated slot as shown in FIG. 11. For example, the intrinsically aggregated slot (1 slot) may include 14 symbols as a combination of two symbol sets that are composed of 7 symbols each. Finally, the UE may transmit an ACK/NACK corresponding to the TB/CB(s) at slot m+k−1.

2. HARQ Process Number Determination

As in the embodiment of FIG. 8, the HARQ process number may be assigned as a single value. A TB may consist of multiple CBs and may be segmented by the unit of CB with the bitwidth of 8448.

The multiple CBs may be transmitted during a period of multiple slots, and data are assigned to the respective slots on the same frequency.

If the slots are configured identically, it may be assumed that the number of CBs are identical in all slots. Whereas, a different number of CBs may be transmitted in different slots. If a multi-bit HARQ is configured, the number of CBs may be considered in HARQ ACK/NACK transmission.

For example, at least one of the DL assignment information, HARQ timing information, slot aggregation level l, and HARQ process number p may be included in the DCI that is transmitted at the timing of slot N.

The gNB may transmit the above information using separate resources. A common value may be determined. Each individual information may be transmitted in a joint coding format. For example, values of a combination of at least two of the HARQ timing information, slot aggregation level, and HARQ process number may be configured in the form of a table. This is just an exemplary combination of some of many parameters included in the DCI, and the present disclosure may include other solutions.

According to an embodiment of the present disclosure, the DL assignment information may be configured per slot to reserve the same resources during the spanned slots.

According to another embodiment of the present disclosure, if the allocation resource position varies at every slot, extra information may be configured. It may be possible to use a hopping pattern that is determined according to a predetermined rule.

The UE may also map the HARQ process IDs to the HARQ timings based on the DL assignment information, HARQ timing information m, spanned slot duration l, and HARQ process number p included explicitly in the DCI and manage the HARQ process IDs. Here, the data received by the UE are managed with one HARQ process ID.

The UE may also calculate the number of CBs being transmitted for managing CBs. For example, the UE may calculate the DL data resources assigned to the UE in a slot in consideration of a TB size, a modulation and coding scheme (MCS), and a number of multiple input multiple output (MIMO) streams. If the assigned resource amount is calculated, the UE may identify a group of CB sets to be retransmitted by the gNB, that is indicated in the NACK, based on the number of CBs per slot. The UE may also perform memory management for resource assignment information received per HARQ process ID.

3. PUCCH Resource Determination for HARQ ACK/NACK

After determining the HARQ timing with the above-described method, a set of resources for HARQ ACK/NACK corresponding to a data transmission is configured on PUCCH resources through higher layer signaling (e.g., RRC signaling), and the resource region for the corresponding UE is indicated by DCI. The UCI may include HARQ ACK/NACK information.

The PUCCH resource may include a short PUCCH with 1 or 2 symbols and/or a long PUCCH with 4 or more symbols. Typically, the short PUCCH may be used in an above 6 GHz band, and the long PUCCH may be used in a below 6 GHz band for covering the LTE cell coverage.

In this case, CP-OFDM or DFT-S-OFDM may be applied to the uplink waveform for the short PUCCH. Also, the DFT-S-OFDM may be applied to the uplink waveform for the long PUCCH.

A resource allocation region for use by the UE in transmitting the UCI including the HARQ ACK/NACK may be prefigured along with the DCI. The preconfigured region may be assigned via a semi-static scheduling through RRC signaling or a dynamic scheduling with DCI in the time-frequency resources.

The related DCI may include at least one of resource assignment information for UCI including the HARQ ACK/NACK, waveform information, and PUCCH type information. For example, the resource may include an RB location, a starting position, and a PRB number. The waveform information has a bitwidth of 1 bit indicating the CP-OFDM or the DFT-S-OFDM. The PUCCH type information has a bitwidth of 1 bit indicating the short PUCCH or the long PUCCH.

For example, at least one of the resource assignment information, waveform information, and PUCCH type information may be included in the DCI. Each of these information has a single value.

The gNB may transmit the above information using separate resources.

The PUCCH resources are assigned differently in amount depending on the per-TB or per-CB ACK/NACK configuration of the gNB.

According to an embodiment of the present disclosure, the per-TB assignment may be performed with 1 bit, and the per-CB or CB group assignment may be performed with multiple bits. A CB group is distinguished by the slot.

According to another embodiment of the present disclosure, if the DL data is transmitted over two slots as shown in FIG. 8 and 2-bit PDCCH resources are assigned, the reception acknowledgement information may be transmitted in a two-bit format that is set to "00" for ACKs corresponding to the first and second slots, "01" for ACK corresponding to the first slot and NACK corresponding to the second slot, "10" for NACK corresponding to the first slot and ACK corresponding to the second slot, and "11" for NACKs corresponding to the first and second slots.

A common value may be determined. The PUCCH type information and the waveform information may be mapped one by one. For example, an indication bit may be set to 0 for the short PUCCH and CP-OFDM or 1 to indicate the long PUCCH and the DFT-S-OFDM. The individual information may be transmitted in a joint coding format. For example, any combinations of the resource assignment information-waveform information and the resource assignment information-PUCCH type information may be configured in the form of a table. These are just exemplary combinations of parameters selected from DCI, and the present disclosure may include other solutions.

The UE may transmit the UCI including an HARQ ACK/NACK in the allocated resources based on at least one of the resource assignment information, waveform information, and PUCCH type information that are explicitly included in the DCI. Here, the HARQ ACK/NACK may be transmitted in the form of 1-bit information indicating whether TB decoding succeeds or consists of ACK/NACK indication bits for respective CBs or CB groups (CBGs). The CBs or CB groups may be distinguished by the slot.

According to an embodiment of the present disclosure, if the DL data is transmitted over two slots as shown in FIG. 8 and 2-bit PDCCH resources are assigned, the reception acknowledgement information may be transmitted in a two-bit format that is set to "00" for ACKs corresponding to the first and second slots, "01" for ACK corresponding to the first slot and NACK corresponding to the second slot, "10" for NACK corresponding to the first slot and ACK corresponding to the second slot, and "11" for NACKs corresponding to the first and second slots.

Uplink Scenario: Slot Aggregation Signaling for UL

Similar to downlink, in uplink, the gNB may transmit TB configuration information to the UE using a slot composition bit. For example, the slot composition bit may be set to "0" for 1 TB per slot or "1" for 1 TB per allocation. Similar to the above-described HARQ ACK/NACK timing determination for DL transmission, it may be possible to design for PUSCH timing for UL transmission, and the HARQ ID assignment for UL transmission may also be understood as an explicit indication as in DL.

Figure 12:
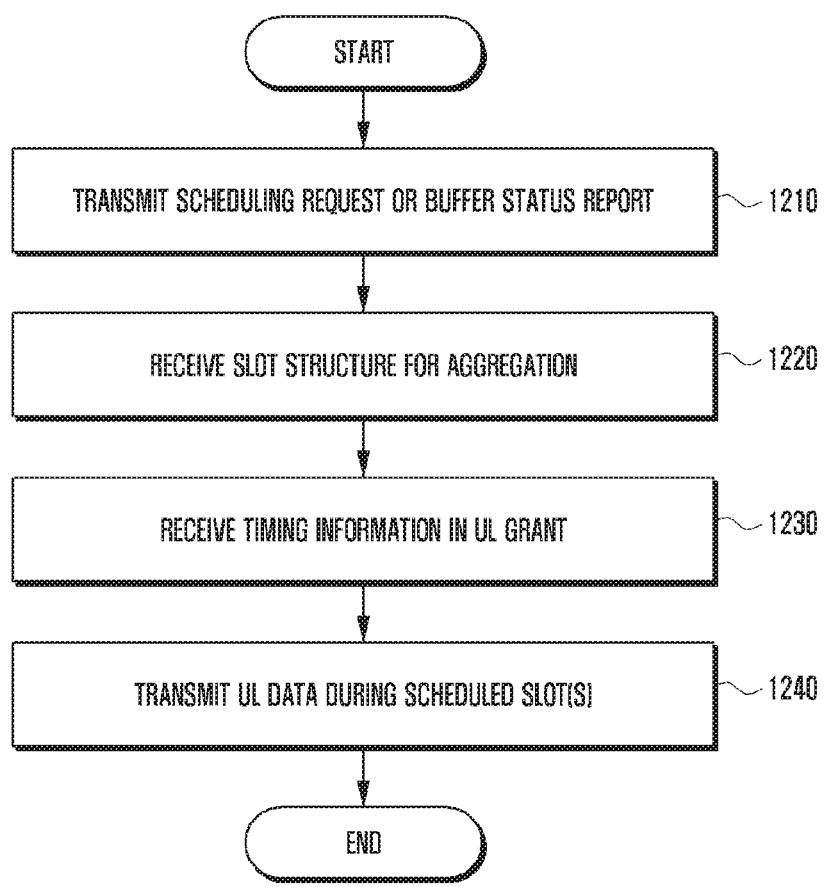
FIG. 12 is a flowchart for illustrating an exemplary slot aggregation signaling for UL transmission according to an embodiment of the present disclosure.

FIG. 12 is a flowchart for explaining slot aggregation signaling for UL transmission according to an embodiment of the present disclosure.

In reference to FIG. 12, the UE transmits to the gNB a scheduling request or a buffer status report at step 1210. The UE receives information on the slot structure for aggregation, at step 1220. The UE receives timing information in a UL grant at step 1230. For example, the UE may receive the information on a starting slot number and a spanned slot duration from the gNB. The UE may transmit UL data during a period of scheduled slot(s) at step 1240.

Figure 13:
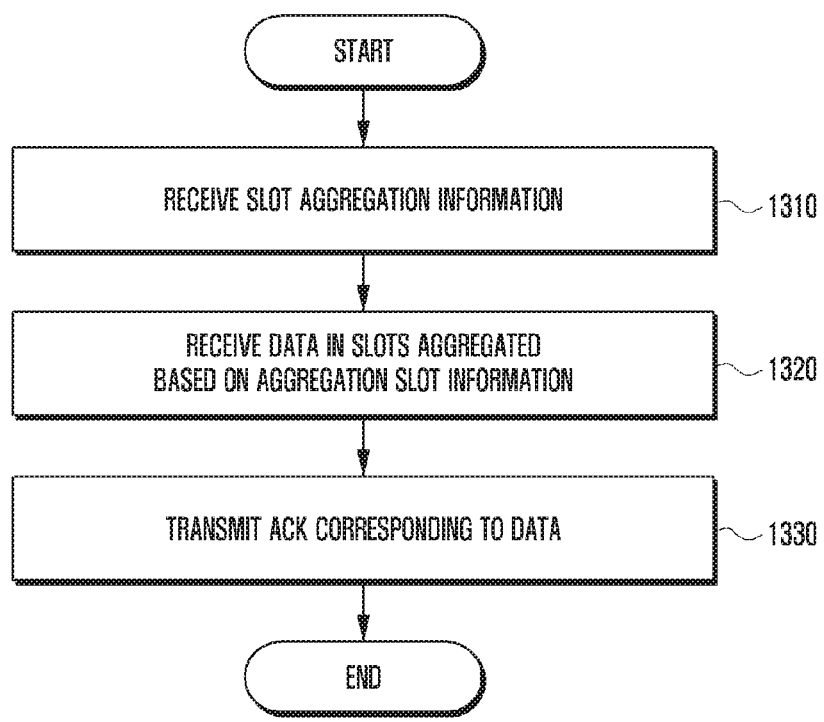
FIG. 13 is a flowchart for illustrating exemplary operations of a UE for slot aggregation signaling according to an embodiment of the present disclosure.

FIG. 13 is a flowchart for explaining operations of a UE for slot aggregation signaling according to an embodiment of the present disclosure.

The UE receives slot aggregation information from the gNB at step 1310. Step 1310 may include steps 510 and 520 of FIG. 5 and steps 610, 620, and 630 of FIG. 6. The slot aggregation information may include the signaling parameters for use in slot aggregation and DCI as listed in Table 1, e.g., information on the starting slot among aggregated slots, information on the duration of the aggregated slots, information on ACK/NACK transmission timing, and information on resource allocation for ACK/NACK transmission. The slot aggregation information may also include the spanned slot duration, resource assignment information, HARQ timing information, slot aggregation level, HARQ process number, resource assignment information for UCI including HARQ ACK/NACK, waveform information, and PUCCH type information as aforementioned in Sections 1. HARQ ACK/NACK Timing determination, 2. HARQ processing number determination, and 3. PUCCH resource determination for HARQ ACK/NACK in Embodiment 1 or 2. The slot aggregation information may be directly or indirectly transmitted through higher layer signaling such as RRC signaling and MAC CE or group-common or UE-specific control channel (e.g., PDCCH). The UE may also receive HARQ-related identification information such as HARQ process number and HARQ process ID along with or separately from the slot aggregation information.

The UE may receive data in the aggregated slots based on the slot aggregation information at step 1320. Step 1320 may be identical with step 530 of FIG. 5 or step 640 of FIG. 6.

The UE transmits an ACK corresponding to the data to the gNB at step 1330. At step 1330, the UE may perform the operation described in Sections 1. HARQ ACK/NACK Timing determination, 2. HARQ processing number determination, and 3. PUCCH resource determination for HARQ ACK/NACK in Embodiment 1 or 2. For example, the UE may determine at least one of HARQ ACK/NACK transmission timings and resources based on the slot aggregation information and transmit the HARQ ACK/NACK based on at least one of the determined HARQ ACK/NACK transmission timings and resources. For example, the HARQ ACK/NACK may be transmitted on the resources determined based on the slot aggregation information at the timing determined based on the slot aggregation information.

Unlike legacy carrier aggregation (CA) for aggregating multiple frequency bands in the frequency domain, the slot aggregation is characterized by aggregating multiple slots in the time domain. That is, the aggregated slot spans multiple slots in the time domain.

Figure 14:
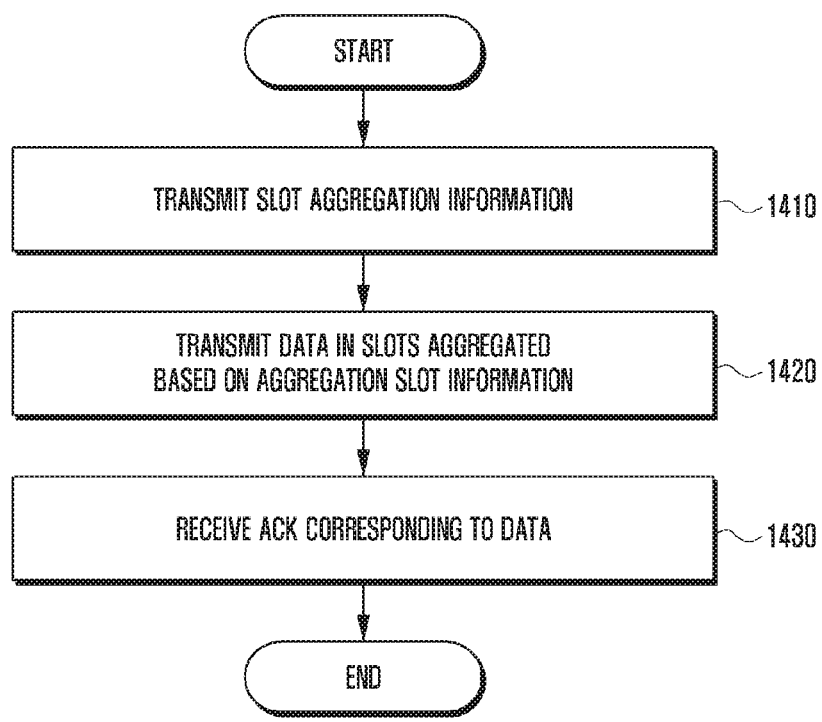
FIG. 14 is a flowchart for illustrating exemplary operations of a gNB for slot aggregation signaling according to an embodiment of the present disclosure.

FIG. 14 is a flowchart for illustrating operations of a gNB for slot aggregation signaling according to an embodiment of the present disclosure.

The gNB performs the operations corresponding to the operations of the UE for slot aggregation signaling that are described with reference to FIG. 13. In detail, the gNB transmits the slot aggregation information to the UE at step 1410. The slot aggregation information may include the information on the starting slot among aggregated slots, the information on the duration of the aggregated slots, the information on ACK/NACK transmission timing, and the information on resource allocation for ACK/NACK transmission. The slot aggregation information may be transmitted through higher layer signaling or UE-specific or group-specific control channel. The gNB may transmit HARQ-related identification information such as HARQ process number and HARQ process ID along with or separately from the slot aggregation information.

The gNB transmits data on the aggregated slots based on the slot aggregation information at step 1420 and receives an ACK/NACK corresponding to the data from the UE at step 1430. The ACK/NACK may be received on the resources determined based on the slot aggregation information at the timing determined based on the slot aggregation information.

Figure 15:
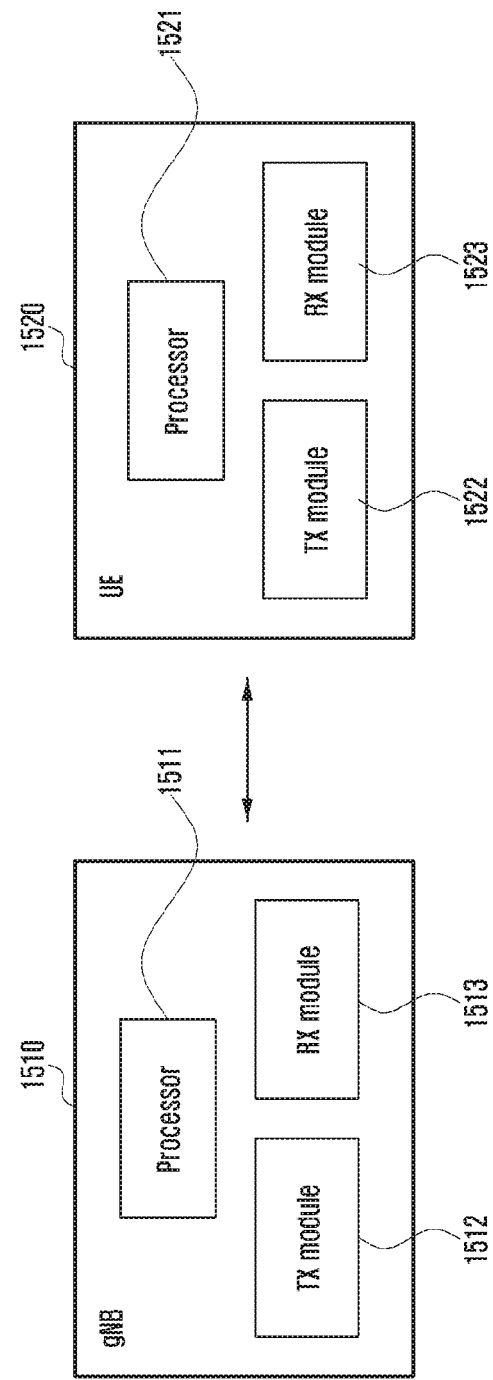
FIG. 15 is a diagram illustrating exemplary configurations of a gNB and a UE according to an embodiment of the present disclosure.

FIG. 15 is a diagram illustrating configurations of a gNB and a UE according to an embodiment of the present disclosure.

The gNB 1510 includes a processor 1511, a transmission (Tx) module 1512, and a reception (Rx) module 1513. The processor 1511 may be referred to as a controller, the Tx module 1512 may be referred to as a transmitter, and the Rx module 1513 may be referred to as a receiver. The Tx module 1512 and the Rx module 1513 may be configured as a single transceiver.

The Tx module 1512 is configured to transmit a signal to the UE 1520. The Rx module 1513 is configured to receive a signal from the UE 1520. The processor 1511 is functionally coupled with the Tx module 1512 and the Rx module 1513 to control the operations of the gNB. For example, the processor 1511 is configured to control the Tx module 1512 to transmit slot aggregation information to the UE 1520 and, subsequently, it controls the Tx module 1512 to transmit data to the UE 1520 based on the slot aggregation information and the Rx module 1513 to receive an ACK/NACK corresponding to the data from the UE 1520.

The UE 1520 includes a processor 1521, a Tx module 1522, and a Rx module 1523. The processor 1521 may be referred to as a controller, the Tx module 1522 may be referred to as a transmitter, and the Rx module may be referred to as a receiver. The Tx module 1522 and the Rx module 1523 may be configured as a transceiver.

The Tx module 1522 is configured to transmit a signal to the gNB 1510. The Rx module 1523 is configured to receive a signal from the gNB 1510. The processor 1521 is functionally coupled with the Tx module 1522 and the Rx module 1523 to control the operations of the UE 1520. For example, the processor 1521 may be configured to control the Rx module 1523 to receive the slog aggregation information from the gNB 1510 and, subsequently, it controls the Rx module 1523 to receive data on the slots aggregated based on the slot aggregation information and controls the Tx module 1522 to transmit an ACK/NACK corresponding to the data to the gNB 1510. The processor 1521 may be configured to determine the HARQ-related identification information based on the slot aggregation information.

As described above, the present disclosure is advantageous in terms of supporting services characterized by a high data throughput and a long packet length with signaling for slot aggregation.

Also, the present disclosure is advantageous in terms of reducing signaling overhead caused by frequent repetitive transmission of a low mobility indoor UE.

Also, the present disclosure is advantageous in terms of reducing a decoding burden of a UE and managing HARQ processes efficiently for data and control signal transmission. That is, the present disclosure is advantageous in terms of efficient management of uplink and downlink HARQ ACK/NACK timing information and resources of HARQ process IDs and feedbacks.

Also, the present disclosure is advantageous in terms of considering extension in accordance with a TB configuration scenario in 5G NR.

Program codes for performing the slot aggregation signaling according to various embodiments of the present disclosure may be stored in a non-transitory computer readable medium. The non-transitory computer readable medium means a machine-readable medium for storing data semi-persistently rather than a medium for storing data temporarily such as register, cache, and memory. In detail, the non-transitory readable media may include CD, DVD, hard disc, Blu-ray disc, USB, memory card, and ROM.

Although preferred embodiments of the disclosure have been described using specific terms, the specification and drawings are to be regarded in an illustrative rather than a restrictive sense in order to help understand the present disclosure, it is obvious to those skilled in the art that various modifications and changes can be made thereto without departing from the broader spirit and scope of the disclosure and such modifications and changes should not be understood individually from the technical spirit or prospect of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal for receiving repetitive data in consecutive slots, the method comprising:
    receiving, from a base station, configuration information including first information on repetitive data across consecutive slots and second information on a set of candidates of hybrid automatic repeat request (HARQ) feedback timing via a radio resource control (RRC) signaling;
    receiving, from the base station, downlink control information (DCI), wherein the DCI includes third information on resource assignment and fourth information for indicating the HARQ feedback timing;
    receiving, from the base station, the repetitive data across the consecutive slots based on the first information on the repetitive data and the third information on the resource assignment;
    in case that the repetitive data across the consecutive slots are successfully received, identifying the HARQ feedback timing among the set of candidates based on the second information on the set of candidates and the fourth information for indicating the HARQ feedback timing; and transmitting, to the base station, an acknowledgment (ACK) based on the HARQ feedback timing.

2. The method of claim 1, wherein the DCI further includes HARQ identification information.

3. The method of claim 1, wherein:
the configuration information further includes information on a physical uplink control channel (PUCCH) resource set, and
a PUCCH resource for transmitting the ACK is determined from the PUCCH resource set based on the information for indicating the PUCCH resource in the DCI.

4. A method performed by a base station for transmitting repetitive data in consecutive slots, the method comprising:
transmitting, to a terminal, configuration information including first information on repetitive data across consecutive slots and second information on a set of candidates of hybrid automatic repeat request (HARQ) feedback timing via a radio resource control (RRC) signaling;
transmitting, to the terminal, downlink control information (DCI), wherein the DCI includes third information on resource assignment and fourth information for indicating the HARQ feedback timing;
transmitting, to the terminal, the repetitive data across the consecutive slots based on the first information on the repetitive data and the third information on the resource assignment; and
receiving, from the terminal, an acknowledgement (ACK) indicating that the repetitive data across the consecutive slots are successfully received based on the HARQ feedback timing,
wherein the HARQ feedback timing is identified among the set of candidates based on the second information on the set of candidates and the fourth information for indicating the HARQ feedback timing.

5. The method of claim 4, wherein the DCI further includes HARQ identification information.

6. A terminal comprising:
a transmitter configured to transmit a signal to a base station;
a receiver configured to receive a signal from the base station; and
a controller coupled with the transmitter and the receiver and configured to:
receive, from the base station via the receiver, configuration information including first information on repetitive data across consecutive slots and second information on a set of candidates of hybrid automatic repeat request (HARQ) feedback timing via a radio resource control (RRC) signaling,
receive, from the base station via the receiver, downlink control information (DCI), wherein the DCI includes third information on resource assignment and fourth information for indicating the HARQ feedback timing, receive, from the base station via the receiver, the repetitive data across the consecutive slots based on the first information on the repetitive data and the third information on the resource assignment,
in case that the repetitive data across the consecutive slots are successfully received, identify the HARQ feedback timing among the set of candidates based on the second information on the set of candidates and the fourth information for indicating the HARQ feedback timing, and
transmit, to the base station via the transmitter, an acknowledgment (ACK) based on the HARQ feedback timing.

7. The terminal of claim 6, wherein the DCI further includes HARQ identification information.

8. The terminal of claim 6, wherein:
the configuration information further includes information on a physical uplink control channel (PUCCH) resource set, and
the controller is further configured to determine a PUCCH resource for transmitting the ACK from the PUCCH resource set based on the information for indicating the PUCCH resource in the DCI.

9. A base station comprising:
a transmitter configured to transmit a signal to a terminal;
a receiver configured to receive a signal from the terminal; and
a controller coupled with the transmitter and the receiver and configured to:
transmit, to the terminal via the transmitter, configuration information including first information on repetitive data across consecutive slots and second information on a set of candidates of hybrid automatic repeat request (HARQ) feedback timing via a radio resource control (RRC) signaling,
transmit, to the terminal via the transmitter, downlink control information (DCI), wherein the DCI includes third information on resource assignment and fourth information for indicating the HARQ feedback timing,
transmit, to the terminal via the transmitter, the repetitive data across the consecutive slots based on the first information on the repetitive data and the third information on the resource assignment, and
receive, from the terminal via the receiver, an acknowledgement (ACK) indicating that the repetitive data across the consecutive slots are successfully received based on the HARQ feedback timing,
wherein the HARQ feedback timing is identified among the set of candidates based on the second information on the set of candidates and the fourth information for indicating the HARQ feedback timing.

10. The base station of claim 9, wherein the DCI further includes HARQ identification information.

* * * * *